(12) United States Patent
Nishida et al.

(10) Patent No.: US 6,710,475 B2
(45) Date of Patent: Mar. 23, 2004

(54) STATOR STRUCTURE HAVING A PRINTED BOARD

(75) Inventors: Shigeru Nishida, Nagano-ken (JP); Atsushi Kindaichi, Nagano-ken (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 58 days.

(21) Appl. No.: 10/151,899

(22) Filed: May 22, 2002

(65) Prior Publication Data

US 2003/0218393 A1 Nov. 27, 2003

(51) Int. Cl.$^7$ ............ H02K 3/50; H02K 29/00; H02K 1/04; H02K 5/12
(52) U.S. Cl. ............ 310/68 R; 310/71; 310/88; 310/214; 310/215; 310/43
(58) Field of Search .............. 310/68 R, 71, 310/DIG. 6

(56) References Cited

U.S. PATENT DOCUMENTS

| | | | |
|---|---|---|---|
| 4,039,875 A | | 8/1977 | Morreale |
| 4,730,136 A | | 3/1988 | Müller |
| 4,898,759 A | * | 2/1990 | Hoover et al. ............... 428/99 |
| 5,723,933 A | * | 3/1998 | Grundl et al. ............. 310/266 |
| 5,900,687 A | * | 5/1999 | Kondo et al. ................ 310/71 |
| 6,013,966 A | * | 1/2000 | Fehrenbacher et al. ..... 310/257 |
| 6,020,660 A | * | 2/2000 | Wright ..................... 310/68 R |
| 6,107,711 A | * | 8/2000 | Borchert ................... 310/68 D |
| 6,181,033 B1 | * | 1/2001 | Wright ..................... 310/67 R |
| 6,285,107 B1 | * | 9/2001 | Sawada et al. ............. 310/254 |

FOREIGN PATENT DOCUMENTS

| | | | |
|---|---|---|---|
| DE | 29 12 802 B1 | 8/1980 | ............ H02K/3/50 |
| DE | 38 05 402 A1 | 9/1988 | ............ H02K/5/04 |
| DE | 38 04 677 C2 | 5/1990 | ............ H02K/5/22 |
| DE | 294 824 A5 | 10/1991 | ............ H02K/3/50 |
| DE | 42 43 845 A1 | 6/1994 | ............ H02K/3/50 |
| DE | 199 20 127 A1 | 11/2000 | ............ H02K/3/28 |
| DE | 101 15 852 A1 | 10/2001 | ............ H02K/3/34 |
| JP | 58009563 A | 1/1983 | ............ H02K/29/00 |
| JP | 61214740 A | 9/1986 | ............ H02K/5/22 |
| JP | 62290343 A | 12/1987 | ............ H02K/29/00 |
| JP | 03098451 A | * 4/1991 | ............ H02K/29/00 |
| JP | 9327165 A | 12/1997 | ............ H02K/3/52 |
| JP | 10191615 A | 7/1998 | ............ H02K/31/14 |
| JP | 11018346 A | 1/1999 | ............ H02K/3/50 |
| JP | 2000-014112 A | 1/2000 | ............ H02K/29/00 |
| JP | 2001-125495 A | 4/2000 | ............ H02K/3/50 |
| JP | 2002-112515 A | 4/2002 | ............ H02K/5/32 |
| JP | 2002186212 A | * 6/2002 | ............ H02K/3/50 |

* cited by examiner

Primary Examiner—Nicholas Ponomarenke
Assistant Examiner—J. Aguirrechea
(74) Attorney, Agent, or Firm—Sughrue Mion, PLLC

(57) ABSTRACT

A projected board portion that is a part of a printed board is positioned externally to an outer diameter position of an annular stator, and can be connected to any of a connector and a lead wire even after resin sealing is performed. In a stator structure having a printed board according to the present invention, a projected board portion of a printed board provided to an insulating cover of an annular stator extends outward beyond an outer diameter position of the annular stator, and a connector or a lead wire can be freely selected and connected to the projected board portion.

4 Claims, 6 Drawing Sheets

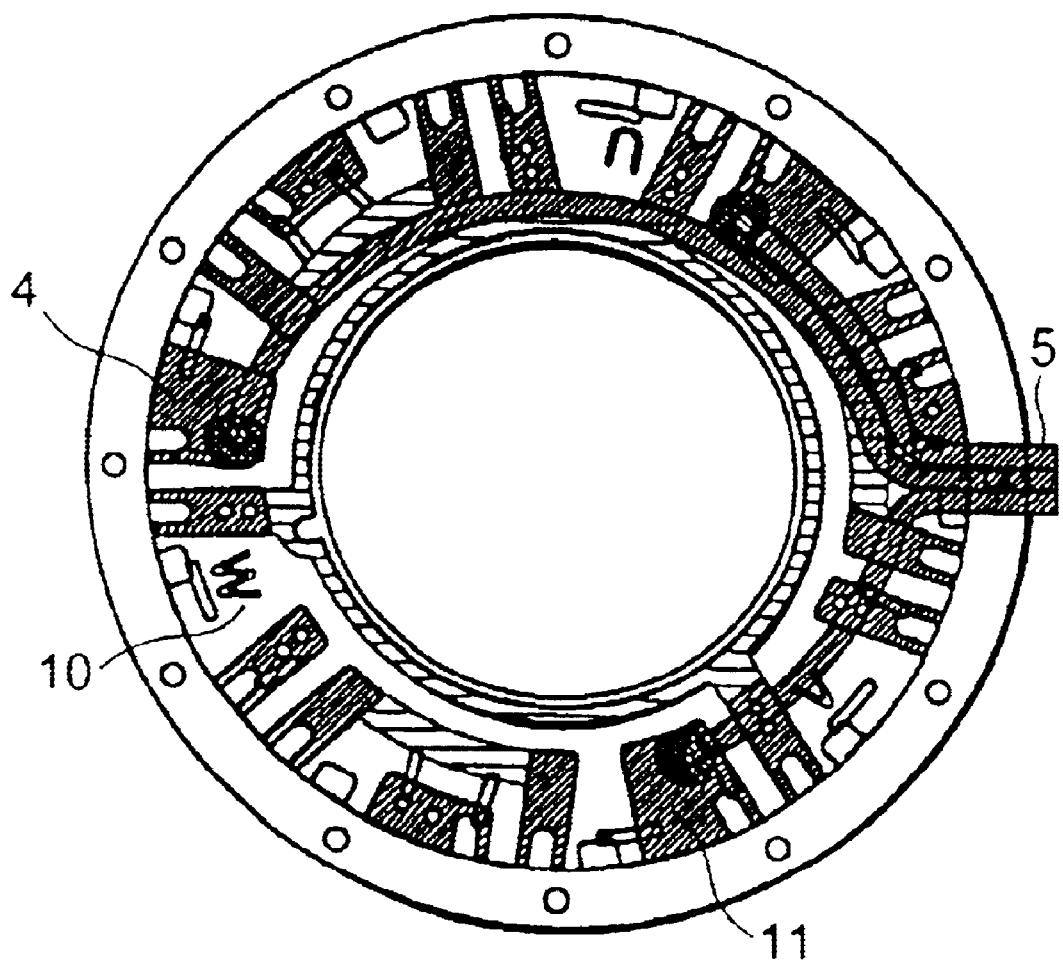

STATOR STRUCTURE HAVING A PRINTED BOARD

BACKGROUND OF THE INVENTION

1. Field of the Invention

The present invention relates to a stator structure having a printed board, and more particularly to a novel improvement in which a connector or a lead wire allows to be provided to a projected board portion that projects externally to an outer diameter position of an annular stator, whereby any of the connector and the lead wire can be freely selected as a drawing means that connects to stator windings even after the stator windings are sealed with a resin.

2. Description of the Related Art

A stator structure of this kind, which is conventionally used, can be generally shown in a first conventional example shown in FIGS. 4 and 5 and a second conventional example shown in FIGS. 6 and 7.

That is, in case of the first conventional example shown in FIGS. 4 and 5, reference numeral 1 indicates a multi-layered annular stator having an annular shape in general, and stator windings 3 of U, V and W phases are wound through an insulating cover 4 formed into an annular shape, for example, in respective slots 2 of the annular stator 1.

A lead wire 5 connected to the stator windings 3 is held in a groove portion 4a formed in the insulating cover 4 to be guided to the outside.

Therefore, in the above-mentioned state, a resin-sealed portion 6 is formed into an annular shape, whereby the stator windings 3 and the insulating cover 4 can be resin-sealed integrally with the annular stator 1. The lead wire 5 is buried in the resin-sealed portion 6.

Further, in addition to the structure of the above-mentioned first conventional example, in case of the second conventional example shown in FIGS. 6 and 7, the parts identical with or equivalent to those in the first conventional example are designated by the same reference symbols. A description therefor is omitted, and only different parts will be described. That is, an annular printed board 10, which is formed into an annular shape, is fixedly arranged in an upper portion of the insulating cover 4, and a printed pattern 11 formed on the annular printed board 10 is connected to the stator windings 3. Also, the lead wire 5 connected to the printed pattern 11 is held in the upper portion of the insulating cover 4.

The resin-sealed portion 6 is formed into an annular shape, whereby the stator windings 3 and the insulating cover 4 can be resin-sealed integrally with the annular stator 1. The lead wire 5 is buried in the resin-sealed portion 6.

The conventional stator structure is structured as described above, and therefore, involves the following problem.

That is, in the first conventional example shown in FIGS. 4 and 5, the lead wire connected to the stator windings is integrally buried in the resin-sealed portion. Thus, for example, in case of a motor, the invention has been limited to the structure in which only a lead wire is drawn from the motor.

Therefore, it has been difficult to deal with a user who requests drawing by a connector.

Further, in the second conventional example shown in FIGS. 6 and 7, the annular printed board is attached to the insulating cover, and the stator windings are connected to the lead wire through the annular printed board. Thus, when the resin sealing is conducted with the resin-sealed portion, the annular printed board, the stator windings, the insulating cover and the lead wire are integrated with the resin-sealed portion. Therefore, the invention has been limited to the structure with the lead wire drawing as described above.

SUMMARY OF THE INVENTION

The present invention has been made to solve the above-mentioned problems, and an object of the present invention is therefore to particularly provide a stator structure having a printed board in which a connector or a lead wire allows to be provided to a projected board portion that projects outward beyond an outer diameter position of an annular stator, whereby any of the connector and the lead wire can be freely selected as a drawing means that connects to stator windings even after the stator windings are resin-sealed.

A stator structure having a printed board according to the present invention comprises: stator windings provided through an insulating cover in respective slots of an annular stator; a printed board provided on one end side of the insulating cover; a projected board portion which is formed in the printed board and which projects outward beyond an outer diameter position of the annular stator; and printed patterns continuously formed from the printed board to the projected board portion, in which the printed patterns each have one end connected to the stator windings. Also, in the structure, through holes are provided which are formed in the printed patterns provided on the projected board portion and which are bored through the projected board portion. Also, in the structure, the projected board portion is provided with a connector arranged along the outer diameter position of the annular stator, and connector pins of the connector are insertedly arranged in the through holes. Also, in the structure, a lead wire is connected to the projected board portion while passing through the through hole, and the lead wire is positioned externally to the outer diameter position of the annular stator.

BRIEF DESCRIPTION OF THE DRAWINGS

In the accompanying drawings:

FIG. 7 is a plan view corresponding to the cross-sectional view of FIG. 6.

DETAILED DESCRIPTION OF THE PREFERRED EMBODIMENTS

Hereinafter, preferred embodiments of a stator structure having a printed board according to the present invention will be described with reference to the accompanying drawings. Note that the parts identical with or equivalent to those in the conventional examples are designated by the same symbols.

Figure 1:
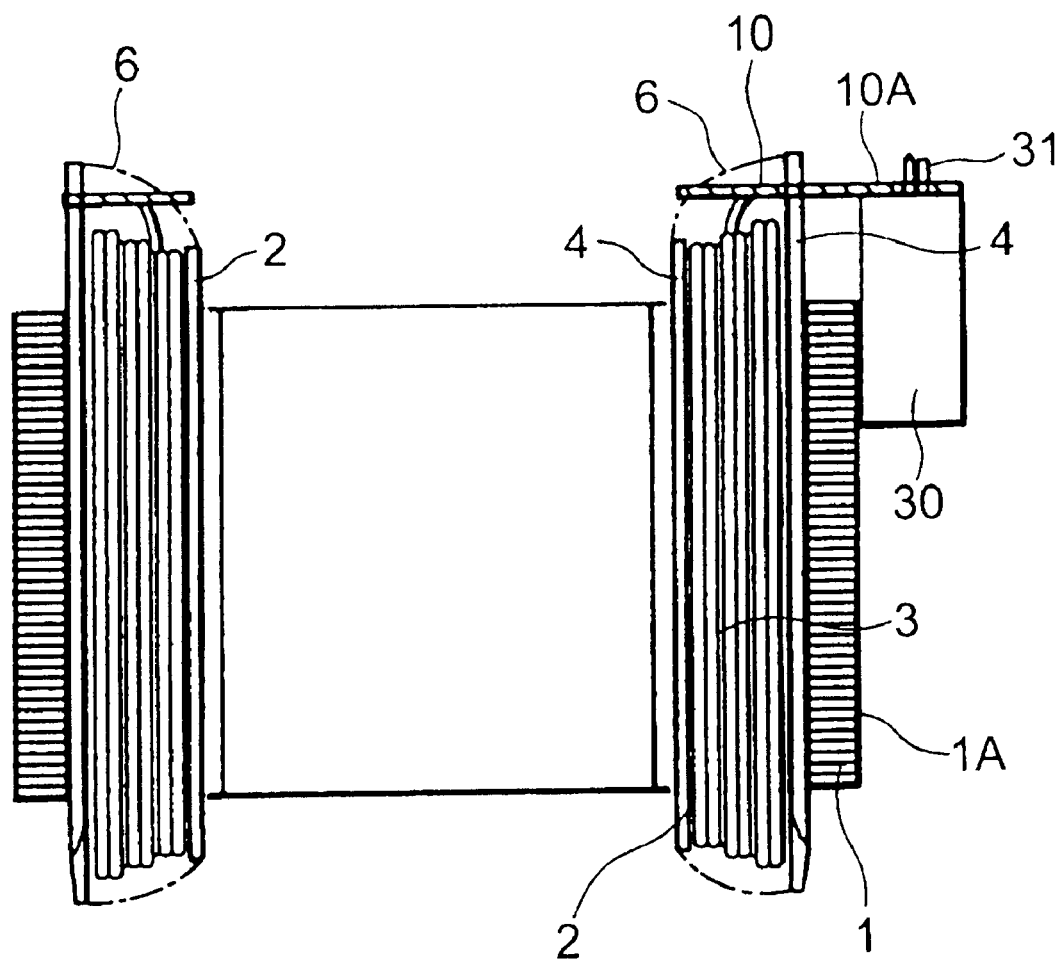
FIG. 1 is a cross-sectional view of a stator structure having a printed board according to the present invention.
Figure 2:
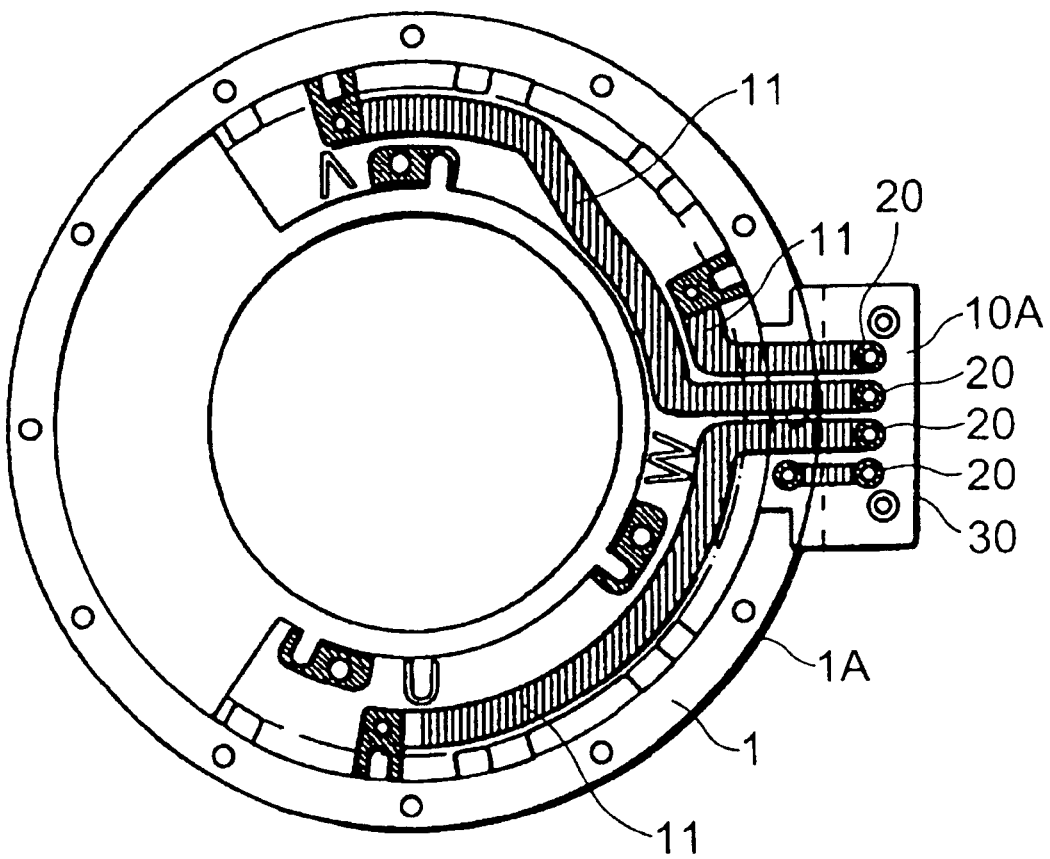
FIG. 2 is a plan view corresponding to the cross-sectional view of FIG. 1.
Figure 3:
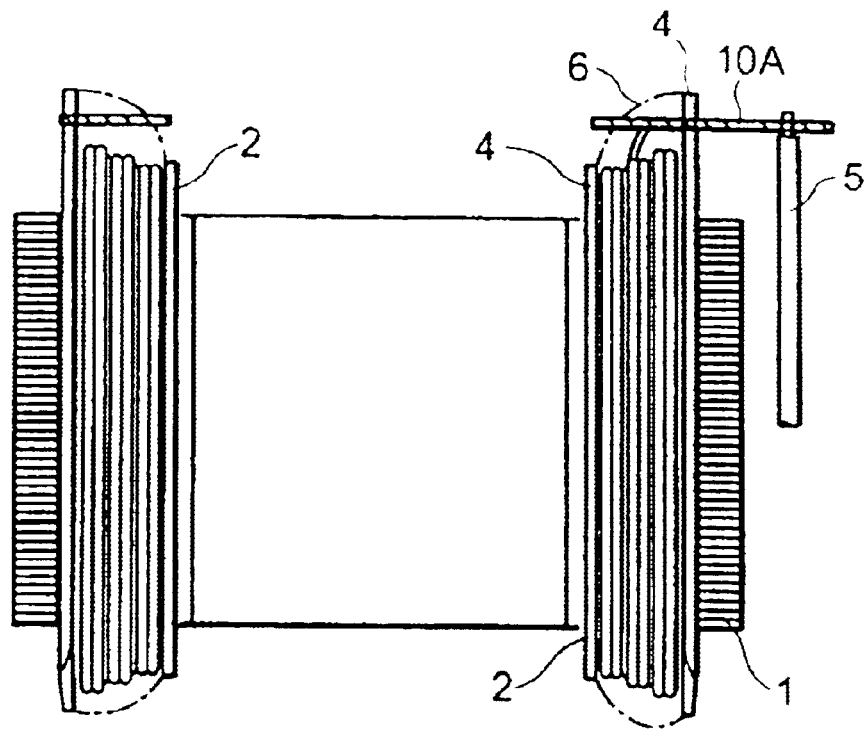
FIG. 3 is a cross-sectional view of another stator structure different from that in FIG. 1.
Figure 4:
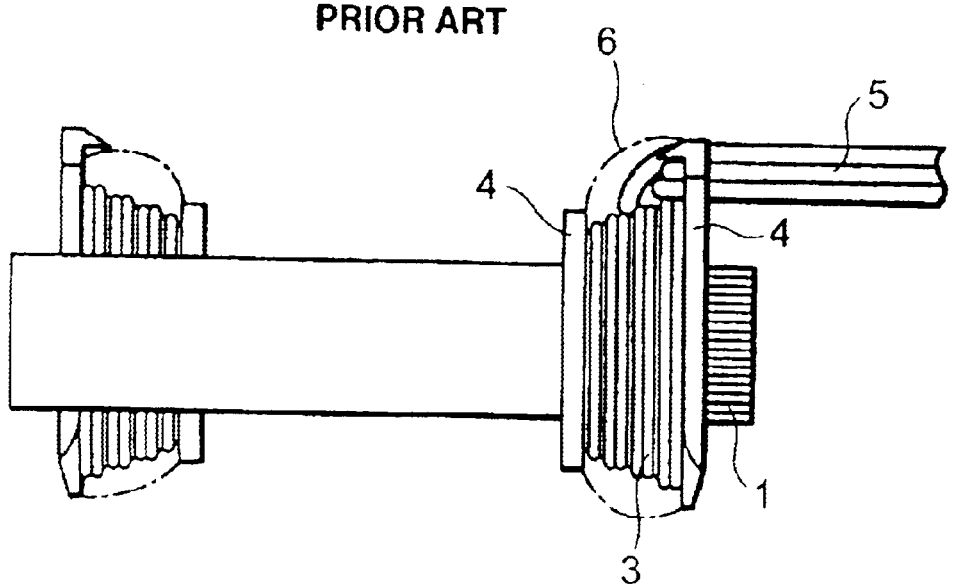
FIG. 4 is a cross-sectional view of a first conventional stator structure.
Figure 5:
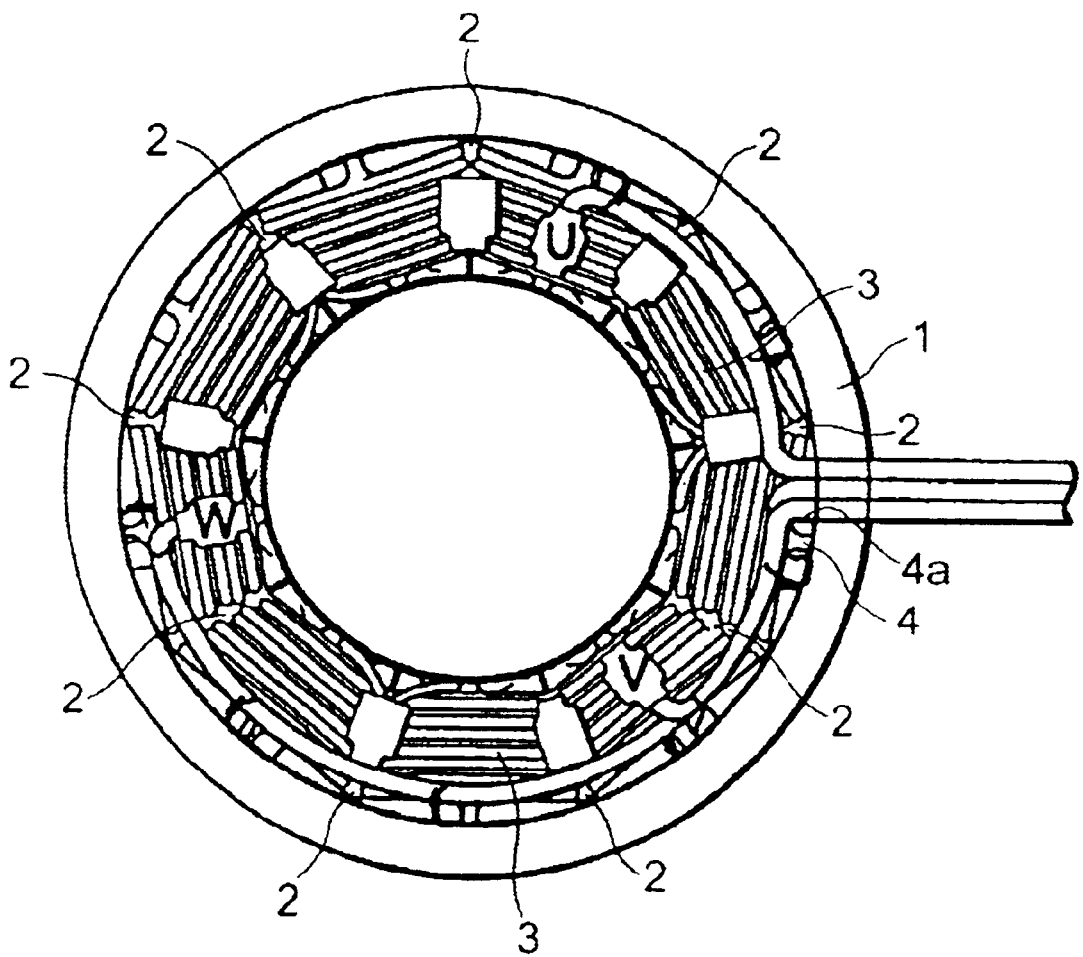
FIG. 5 is a plan view corresponding to the cross-sectional view of FIG. 4.
Figure 6:
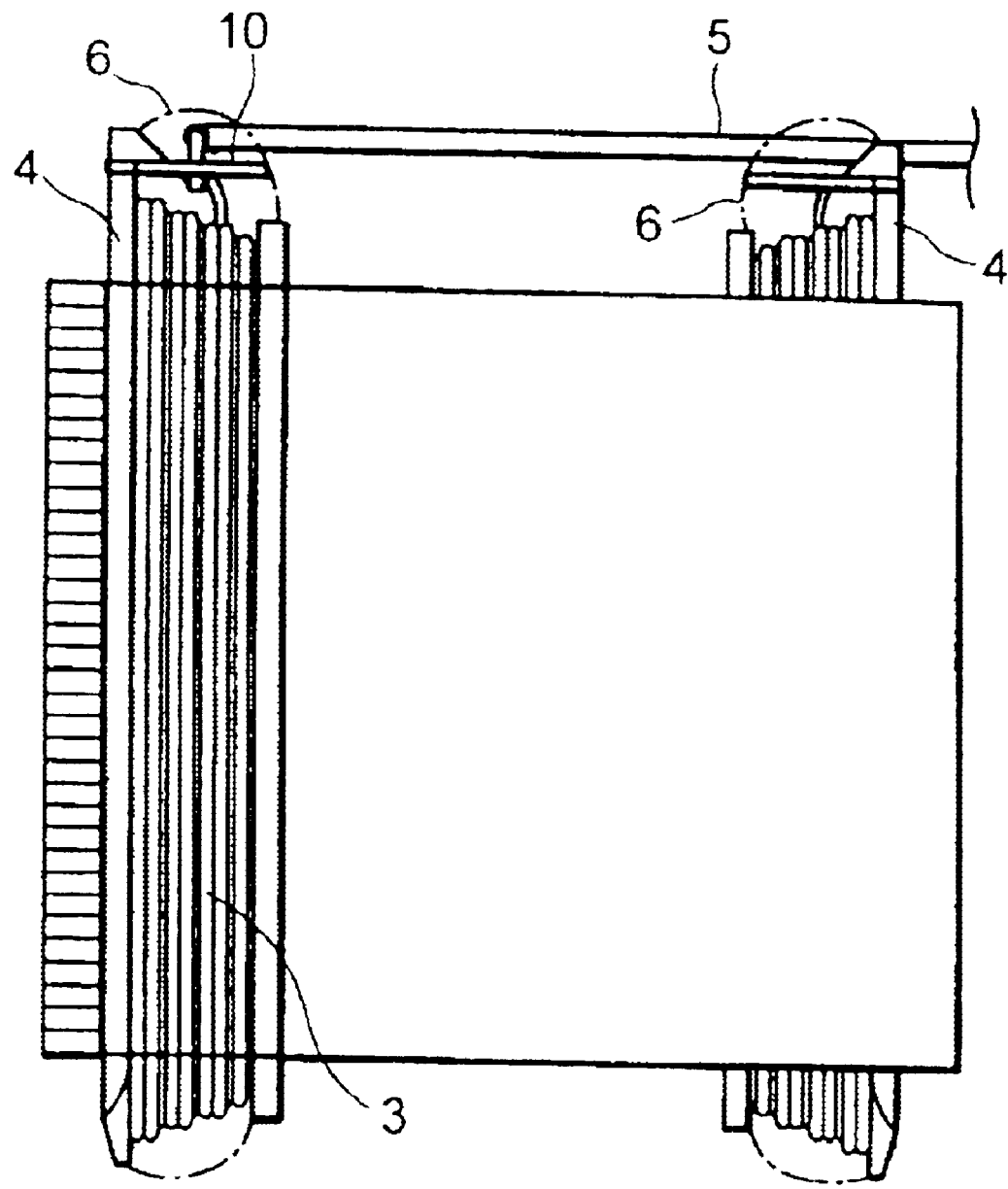
FIG. 6 is a cross-sectional view of a second conventional stator structure.

In FIGS. 1 to 3, reference numeral 1 indicates a multi-layered annular stator having an annular shape in general, and stator windings 3 of U, V and W phases are wound through an insulating cover 4 formed into an annular shape in respective slots 2 of the annular stator 1.

As shown in FIG. 2, an upper portion of the insulating cover 4 is fixedly arranged with a U-shaped printed board 10 having an semi-annular shape in general which integrally has at one end thereof a projected board portion 10A that projects along the radius direction.

The projected board portion 10A has substantially a rectangular shape in plane, and is positioned such that the almost region of the shape projects outward beyond an outer diameter position 1A that forms an outer diameter of the annular stator 1.

On the printed board 10, printed patterns 11 are continuously formed from the printed board 10 to the projected board portion 10A, and a plurality of through holes 20, which are bored through the projected board portion 10A in a board thickness direction, are formed at one ends of the respective printed patterns 11 positioned on the projected board portion 10A. Further, the stator windings 3 are connected to the printed patterns 11.

The through holes 20 are provided with a conductive film on an inside thereof with, for example, a known through-hole technique so as to have electrical continuity with the printed patterns 11.

Accordingly, the stator windings 3, the insulating cover 4 and the annular stator 1 are integrated by being covered by the resin-sealed portion 6.

A connector 30 is attached to a lower surface of the projected board portion 10A in FIG. 1, and connector pins 31 of the connector 30 pass through the through holes 20 and are fixed by soldering or the like. Also, electrical continuity is established between the connector pins 31 and the printed patterns 11.

The connector 30 is provided externally to the outer diameter position 1A and provided to have a long shape along the outer diameter position 1A.

Further, in another embodiment of a stator structure shown in FIG. 3, a lead wire 5 is insertedly arranged in the through hole 20 of the projected board portion 10A, and the lead wire 5 is positioned externally to the outer diameter position 1A.

Therefore, in the above-mentioned embodiments shown in FIG. 1 and FIG. 3, input or output of signals to the stator windings 3 can be conducted through the connector 30 or the lead wire 5.

Further, any of the connector 30 and the lead wire 5 can be attached to the projected board portion 10A even after the resin-sealed portion 6 is provided, and any of them can be used in accordance with the request from an user. Note that the printed board 10 has a semi-annular shape, but may also have an annular shape.

The stator structure having a printed board according to the present invention is structured as described above, and thus, the following effect can be obtained.

That is, since the projected board portion of the printed board provided in the annular stator projects outward beyond the outer diameter position of the annular stator, the connector or the lead wire can be directly attached to the projected board portion in accordance with the request from the user even after the resin-sealed portion of the stator windings is formed. Thus, the request from the user can be freely accepted, and therefore, the workability can be remarkably improved in comparison with the conventional case.

What is claimed is:

1. A stator structure having a printed board, comprising:

stator windings provided through an insulating cover in respective slots of an annular stator;

a resin-scaled portion for a stator winding in said insulating cover;

a printed board provided on one end side of the insulating cover;

a projected board portion formed in the printed board and projectsing outward beyond an outer diameter position of the annular stator for selectively connecting a connector or a lead wire; and printed patterns continuously formed from the printed board to the projected board portion, the printed patterns each having one end connected to the stator windings.

2. A stator structure having a printed board according to claim 1, wherein through holes are provided which are formed in the printed patterns provided on the projected board portion and which are bored through the projected board portion.

3. A stator structure having a printed board according to claim 2, wherein the projected board portion is provided with a connector arranged along the outer diameter position of the annular stator, and connector pins of the connector are insertedly arranged in the through holes.

4. A stator structure having a printed board according to claim 2, wherein a lead wire is connected to the projected board portion while passing through the through hole (20), and the lead wire is positioned externally to the outer diameter position of the annular stator.

* * * * *